United States Patent
Gandhi et al.

(10) Patent No.: US 7,594,057 B1
(45) Date of Patent: Sep. 22, 2009

(54) METHOD AND SYSTEM FOR PROCESSING DMA REQUESTS

(75) Inventors: Rajendra R. Gandhi, Laguna Niguel, CA (US); Kuangfu D. Chu, Irvine, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 133 days.

(21) Appl. No.: 11/328,358

(22) Filed: Jan. 9, 2006

(51) Int. Cl.
G06F 13/36 (2006.01)

(52) U.S. Cl. .................. 710/308; 710/22; 710/33; 710/39; 710/54; 710/310

(58) Field of Classification Search ............ 710/33–35, 710/39, 22, 52, 54, 308, 310
See application file for complete search history.

(56) References Cited

U.S. PATENT DOCUMENTS

| | | | | |
|---|---|---|---|---|
| 5,541,919 A * | 7/1996 | Yong et al. | ................ | 370/416 |
| 5,905,911 A * | 5/1999 | Shimizu | ................ | 710/22 |
| 5,930,525 A * | 7/1999 | Gotesman et al. | ................ | 710/30 |
| 6,046,817 A * | 4/2000 | Brown et al. | ................ | 358/1.16 |
| 6,070,202 A * | 5/2000 | Minkoff et al. | ................ | 710/56 |
| 6,195,334 B1 * | 2/2001 | Kadambi et al. | ................ | 370/236 |
| 6,279,052 B1 * | 8/2001 | Upadrastra | ................ | 710/22 |
| 6,557,055 B1 * | 4/2003 | Wiese | ................ | 710/36 |
| 6,625,157 B2 * | 9/2003 | Niu et al. | ................ | 370/395.71 |
| 6,715,002 B2 * | 3/2004 | Kasper | ................ | 710/29 |
| 6,721,826 B2 * | 4/2004 | Hoglund | ................ | 710/52 |
| 6,785,751 B1 * | 8/2004 | Connor | ................ | 710/52 |
| 6,804,761 B1 * | 10/2004 | Chen et al. | ................ | 711/170 |
| 6,820,129 B1 * | 11/2004 | Courey, Jr. | ................ | 709/234 |
| 6,907,042 B1 * | 6/2005 | Oguchi | ................ | 370/412 |
| 2004/0228285 A1 * | 11/2004 | Moon et al. | ................ | 370/252 |
| 2005/0015517 A1 * | 1/2005 | Fike et al. | ................ | 709/250 |
| 2007/0064025 A1 * | 3/2007 | Haga | ................ | 347/5 |
| 2008/0040519 A1 * | 2/2008 | Starr et al. | ................ | 710/39 |

* cited by examiner

*Primary Examiner*—Mark Rinehart
*Assistant Examiner*—Nimesh G Patel
(74) *Attorney, Agent, or Firm*—Klein, O'Neill & Singh, LLP (57) ABSTRACT

Method and system for processing direct memory access (DMA) requests in a peripheral device is provided. The method includes generating a DMA request to transfer information to/from a host system, wherein a size of data transfer is specified in the DMA request and is based on a minimum data transfer size; and submitting the DMA request to an arbitration module to gain access to a bus for transferring the information and while the arbitration module arbitrates between pending DMA requests, the DMA module monitors status from plural buffer slots and before the DMA request is granted, the DMA module modifies the size of data transfer based on available buffer slots.

18 Claims, 7 Drawing Sheets

METHOD AND SYSTEM FOR PROCESSING DMA REQUESTS

FIELD OF THE INVENTION

The present invention relates to computing systems, and more particularly, to processing direct memory access ("DMA") operations.

BACKGROUND OF THE INVENTION

Computing systems typically include several functional components. These components may include a central processing unit (CPU), main memory, input/output ("I/O") devices, and streaming storage devices (for example, tape drives). In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

Host systems communicate with various devices using standard network interface and standard computer bus architectures. Direct memory access (DMA) requests are used to move data to/from a host system memory. DMA modules (also referred to as channels) are typically used to move data to and from a host system memory. DMA modules provide address and control information to generate read and write accesses to host memory.

A single DMA channel typically breaks up a DMA data transfer request from a host system into smaller requests to comply with interface protocol requirements. Some of the factors affecting the break up of a DMA request include payload size requirement and address boundary alignment on a PCI-X/PCI-Express interface (or any other interface), and frame size negotiation on fibre channel interface and others.

In conventional systems, often a DMA channel generates a request with a fixed or minimum frame size. This is based on being able to transfer a packet/frame (collectively referred to as data) of a particular size. However, a DMA channel may have more data available for transfer between the time it generates the DMA request and when an arbitration module grants access. The conventional approach of generating DMA requests based on fixed size is static and undesirable because the DMA channel can only transfer data that it specifies in the DMA request regardless of whether more data is available for transfer. This shortcoming is especially undesirable in high bandwidth network operations (for example, 1 Gigabit (G) to 10 G networks) because it results in latency. Therefore, optimizing DMA request handling continues to be a challenge in the computing industry.

SUMMARY OF THE INVENTION

In one aspect of the present invention, a method for processing direct memory access (DMA) requests in a peripheral device is provided. The method includes generating a DMA request to transfer information to/from a host system, wherein a size of data transfer is specified in the DMA request and is based on a minimum data transfer size; and submitting the DMA request to an arbitration module to gain access to a bus for transferring the information and while the arbitration module arbitrates between pending DMA requests, the DMA module monitors status from buffer slots and before the DMA request is granted, the DMA module modifies the size of data transfer based on available buffer slots.

In another aspect of the present invention, a system for processing direct memory access (DMA) requests in a peripheral device is provided. The system includes a host system operationally interfacing with the peripheral device. The peripheral device includes a DMA module for generating a DMA request to transfer information to/from the host system, wherein a size of data transfer is specified in the DMA request and is based on a minimum data transfer size; and an arbitration module that receives the DMA request from the DMA module to gain access to a bus for transferring the information and while the arbitration module arbitrates between pending DMA requests, the DMA module monitors status from buffer slots and before the DMA request is granted, the DMA module modifies the size of data transfer based on available buffer slots.

In yet another aspect of the present invention, an input/output peripheral device is provided. The device includes a DMA module for generating a direct memory access ("DMA") request to transfer information to/from a host system, wherein a size of data transfer is specified in the DMA request and is based on a minimum data transfer size; and an arbitration module that receives the DMA request from the DMA module to gain access to a bus for transferring the information and while the arbitration module arbitrates between pending DMA requests, the DMA module monitors status from buffer slots and before the DMA request is granted, the DMA module modifies the size of data transfer based on available buffer slots.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIGS. 1B(i)-1B(ii) (referred to as FIG. 1B) show a block diagram of a HBA, used according to one aspect of the present invention;

DETAILED DESCRIPTION OF THE PREFERRED EMBODIMENTS

To facilitate an understanding of the preferred embodiment, the general architecture and operation of a storage area network (SAN), and a host bus adapter (HBA) will be described. The specific architecture and operation of the preferred embodiment will then be described with reference to the general architecture of the SAN and HBA.

Host System/HBA:

Host systems often communicate with peripheral devices via an interface/bus such as the Peripheral Component Interconnect ("PCI") interface, incorporated herein by reference in its entirety. PCI-X is another bus standard that is compatible with existing PCI cards using the PCI bus. The PCI-X standard is also incorporated herein by reference in its entirety.

PCI-Express (incorporated herein by reference in its entirety) is yet another standard interface used by host systems to interface with peripheral devices. PCI-Express is an Input/Output ("I/O") bus standard (incorporated herein by reference in its entirety) that uses discrete logical layers to process inbound and outbound information.

Various other standard interfaces are also used to move data between host systems and peripheral devices. Fibre Channel is one such standard. Fibre Channel (incorporated herein by reference in its entirety) is an American National Standard Institute (ANSI) set of standards, which provides a serial transmission protocol for storage and network protocols.

Host systems are used in various network applications, including SANs. In SANs, plural memory storage devices are made available to various host computing systems. Data in a SAN is typically moved between plural host systems and storage systems (or storage devices, used interchangeably throughout this specification) through various controllers/adapters, for example, host bus adapters ("HBAs").

HBAs (a PCI/PCI-X/PCI-Express device) that are placed in SANs receive serial data streams (bit stream), align the serial data and then convert it into parallel data for processing. HBAs operate as a transmitting device as well as a receiving device.

DMA modules in HBAs are used to perform data transfers between host memory and the HBA without host processor intervention. The local HBA processor, for example 106A in FIG. 1B, initializes and sets up the DMA channel registers with the starting address of the host memory and length of the data transfer. In conventional methods, the smallest unit of transfer required to comply with the network interface (for example, the Fibre Channel interface) protocol typically fixes the size of the DMA burst. For example, in a fibre channel environment, a DMA request size is based on a single fibre channel frame. Therefore, to transfer multiple frames, multiple DMA requests are generated, which results in latency and inefficiencies.

A DMA read request is a request from a DMA module (or channel) to transfer data from a host system to a storage device. A DMA write request is a request from a DMA module to transfer data from the storage device to a host system.

HBAs typically implement multiple DMA channels with an arbitration module that arbitrates for the access to a PCI/PCI-X bus or PCI-Express link. This allows an HBA to switch contexts between command, status and data. Multiple channels are serviced in periodic bursts.

Figure 1A:
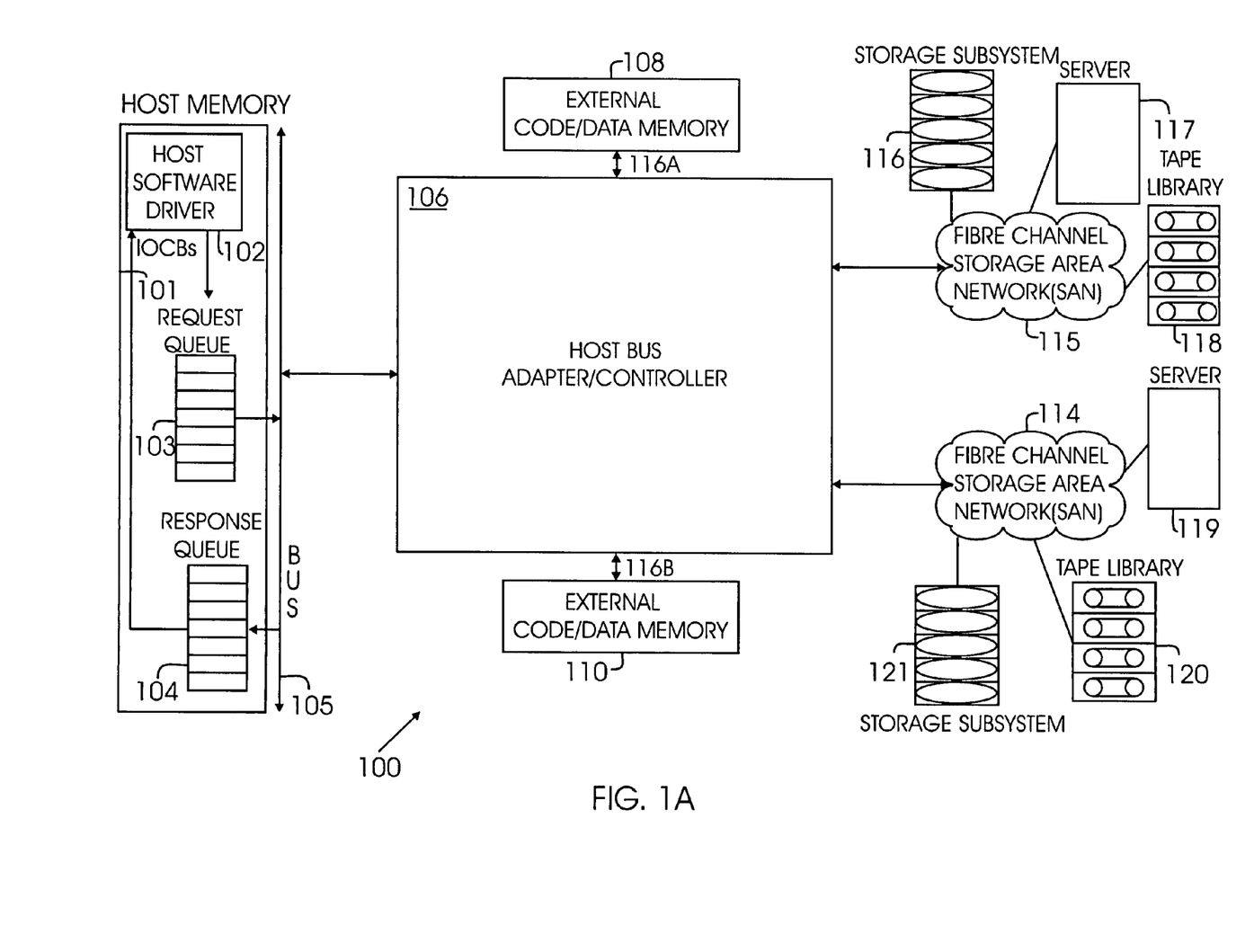
FIG. 1A shows a block diagram of a storage area network.

FIG. 1A shows a SAN system 100 that uses a HBA 106 (may also be referred to as "adapter 106") for communication between a host system with host memory 101 with various systems (for example, storage subsystem 116 and 121, tape library 118 and 120, and servers 117 and 119) using fibre channel storage area networks 114 and 115. The host system uses a driver 102 that co-ordinates data transfers via adapter 106 using input/output control blocks ("IOCBs").

A request queue 103 and response queue 104 is maintained in host memory 101 for transferring information using adapter 106. The host system communicates with adapter 106 via a bus 105 through an interface described below with respect to FIG. 1B.

Figure 1B:
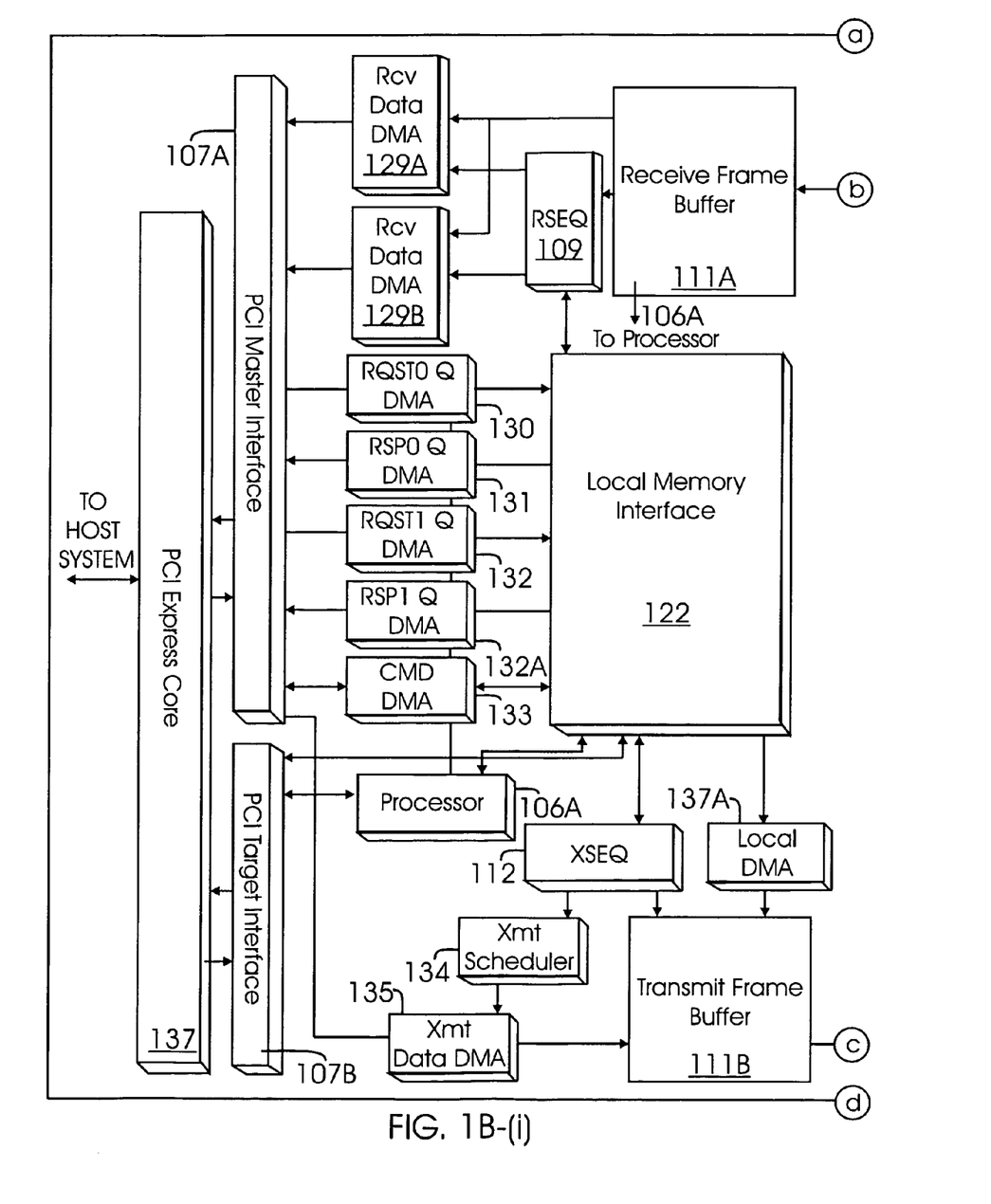

FIG. 1B shows a block diagram of adapter 106. Adapter 106 includes processors (may also be referred to as "sequencers") "RSEQ" 109 and "XSEQ" 112 for receive and transmit side, respectively for processing data received from storage sub-systems and transmitting data to storage sub-systems. Transmit path in this context means data path from host memory 101 to the storage systems via adapter 106. Receive path means data path from storage subsystem via adapter 106. It is noteworthy, that only one processor is used for receive and transmit paths, and the present invention is not limited to any particular number/type of processors. Buffers 111A and 111B are used to store information in receive and transmit paths, respectively.

Besides dedicated processors on the receive and transmit path, adapter 106 also includes processor 106A, which may be a reduced instruction set computer ("RISC") for performing various functions in adapter 106.

Adapter 106 also includes fibre channel interface (also referred to as fibre channel protocol manager "FPM") 113 that includes modules 113A and 113B in receive and transmit paths, respectively (shown as "FC RCV" and "FC XMT"). Modules 113A and 113B allow data to move to/from storage systems and are described below in detail. Frames 146A are received from a fibre channel network, while frames 146B are transmitted to the fibre channel network.

Adapter 106 is also coupled to external memory 108 and 110 via connection 116A/116B (FIG. 1A) (referred interchangeably, hereinafter) and local memory interface 122. Memory interface 122 is provided for managing local memory 108 and 110. Local DMA module 137A is used for gaining access to a channel to move data from local memory (108/110). Adapter 106 also includes a serial/de-serializer (shown as "XGXS/SERDES") 136 for converting data from 10-bit to 8-bit format and vice-versa, and is described below in detail.

Adapter 106 also includes request queue DMA channel (0) 130, response queue (0) DMA channel 131, response queue (1) 132A, and request queue (1) DMA channel 132 that interface with request queue 103 and response queue 104; and a command DMA channel 133 for managing command information. DMA channels are coupled to an arbiter module (204, FIG. 2B) that receives requests and grants access to a certain channel.

Both receive and transmit paths have DMA modules "RCV DATA DMA" 129A and 129B and "XMT DATA DMA" 135 that are used to gain access to a channel for data transfer in the receive/transmit paths. Transmit path also has a scheduler 134 that is coupled to processor 112 and schedules transmit operations.

The host processor (not shown) sets up command/control structures in the host memory 101. These control structures are then transferred into the Local (or External) Memory 108 (or 110) by the local RISC processor 106A. The local RISC processor then executes them with the help of the appropriate sequencer (i.e. 109 or 112).

PCI Express (or PCI-X) master interface 107A and PCI target interface 107B are both coupled to a PCI-Express Core (or PCI-X core) logic 137 (may also be referred to as "logic 137"). Logic 137 is coupled to a host system. Interface 107A and 107B include an arbitration module that processes DMA access to plural DMA channels.

Figure 2A:
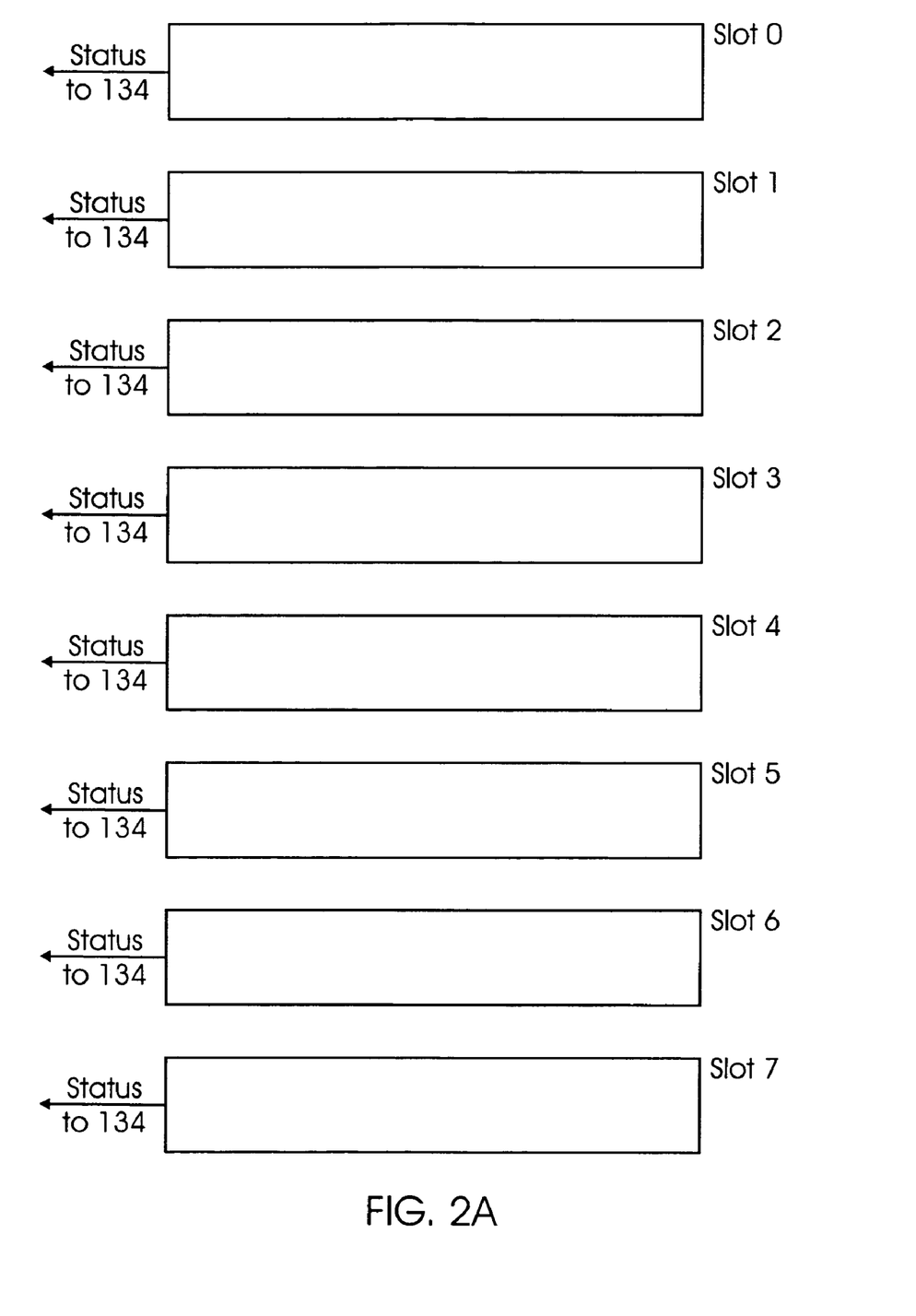
FIG. 2A shows a block diagram of a transmit buffer used by a HBA to transmit frames to a Fibre Channel network.

FIG. 2A shows examples of slots 0-7 of transmit buffer 111B. Transmit buffer 111B has various slots (shown as 0-7). Each slot operates independently, i.e. read and written independently. A status is sent to scheduler 134 when a particular slot is ready to be written. Scheduler 134 schedules a write operation, when a slot is ready to be written. DMA requests are used to gain access to bus 105 to move data to slots 0-7.

Read buffer 111A also has a similar configuration as transmit buffer 111B, except it is used to stage frames/data that is being received from the network before being transferred to host system memory.

Figure 2B:
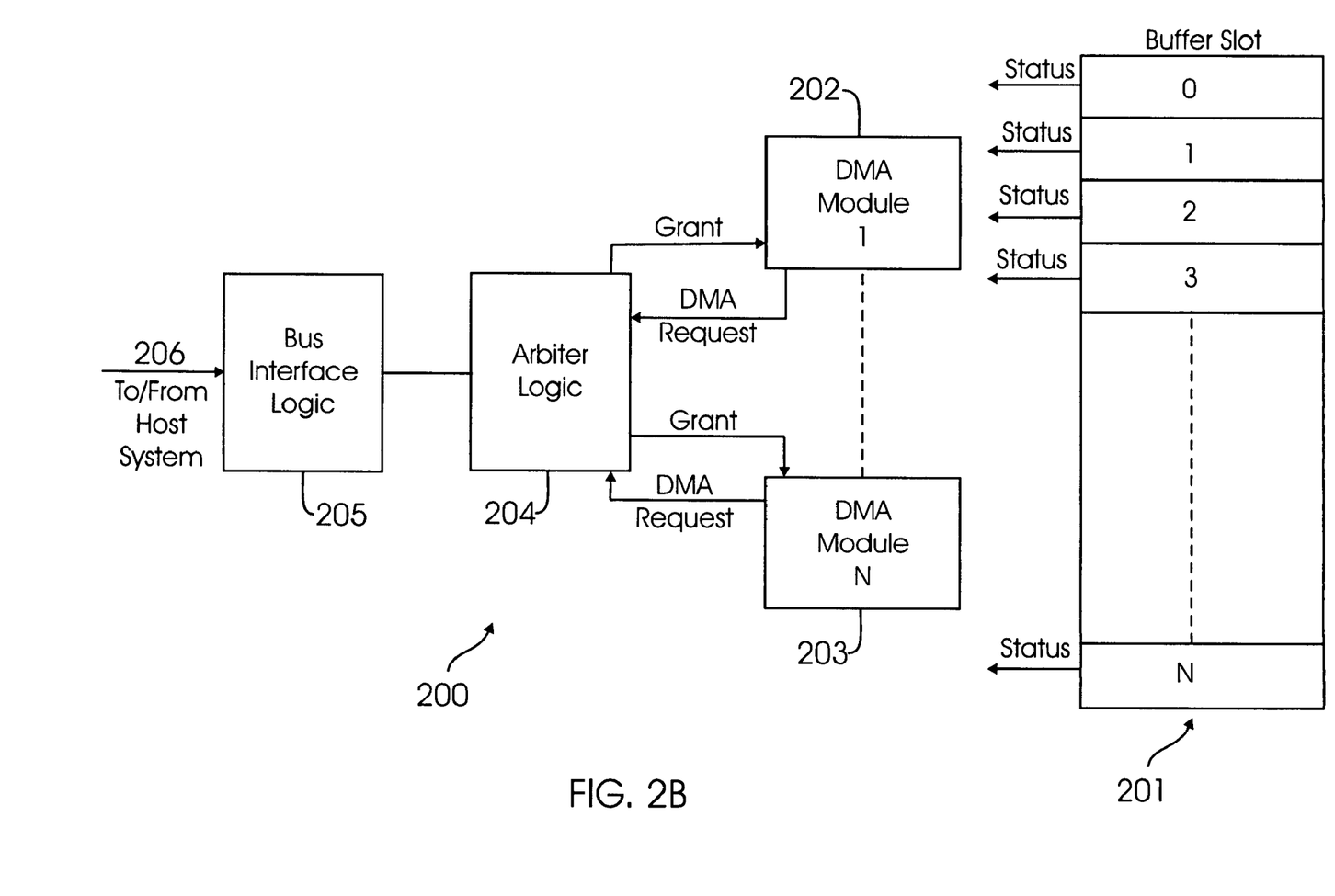
FIG. 2B shows a block diagram of a DMA system, used according to one aspect of the present invention.

FIG. 2B shows an example of a generic system that optimizes DMA request handling for both transmit/receive sides (i.e. for reading or writing data to/from a host system memory), according to one aspect of the present invention. A buffer (similar to buffers 111A and 111B) has plural slots. These slots send a status to plural DMA modules (shown as 201 and 203) when they become available to accept data (slot empty status) for transmission to a fibre channel interface (113) or send data (slot full status) when receiving from the fibre channel interface. The DMA modules in FIG. 2B are similar to the DMA modules 135 and 129A/129B.

DMA requests are generated by DMA modules (shown as 202 and 203) after they are initiated by processor 106A. All DMA requests are sent to an arbitration module (shown as arbiter logic 204) that arbitrates between plural DMA requests. Arbiter 204 checks to see if slots are available to accommodate the DMA request size. Arbiter 204 grants access to a DMA request, which means a particular DMA channel has access to the bus (shown as 206) via bus interface logic 205 (similar to modules 137, 107A and 107B).

In one aspect of the present invention, DMA 202 generates a request based on a minimum data transfer size (for example, 2K) to comply with network interface requirements. This indicates to the arbiter 204 the size of the data transfer. However, while arbiter 204 is arbitrating (i.e. before the request is granted), if DMA module gets status availability indicators from other slots, then DMA module 202 can aggregate status information from multiple slots and request a transfer size that is greater than the minimum size. At grant, the transfer size is fixed and is based on the available slots. This dynamic DMA request size allocation ensures that the optimum amount of data is transferred within a single request. With this new adaptive method, multiple frames are transferred with a single DMA request instead of one DMA request per frame in conventional methods.

Figure 3:
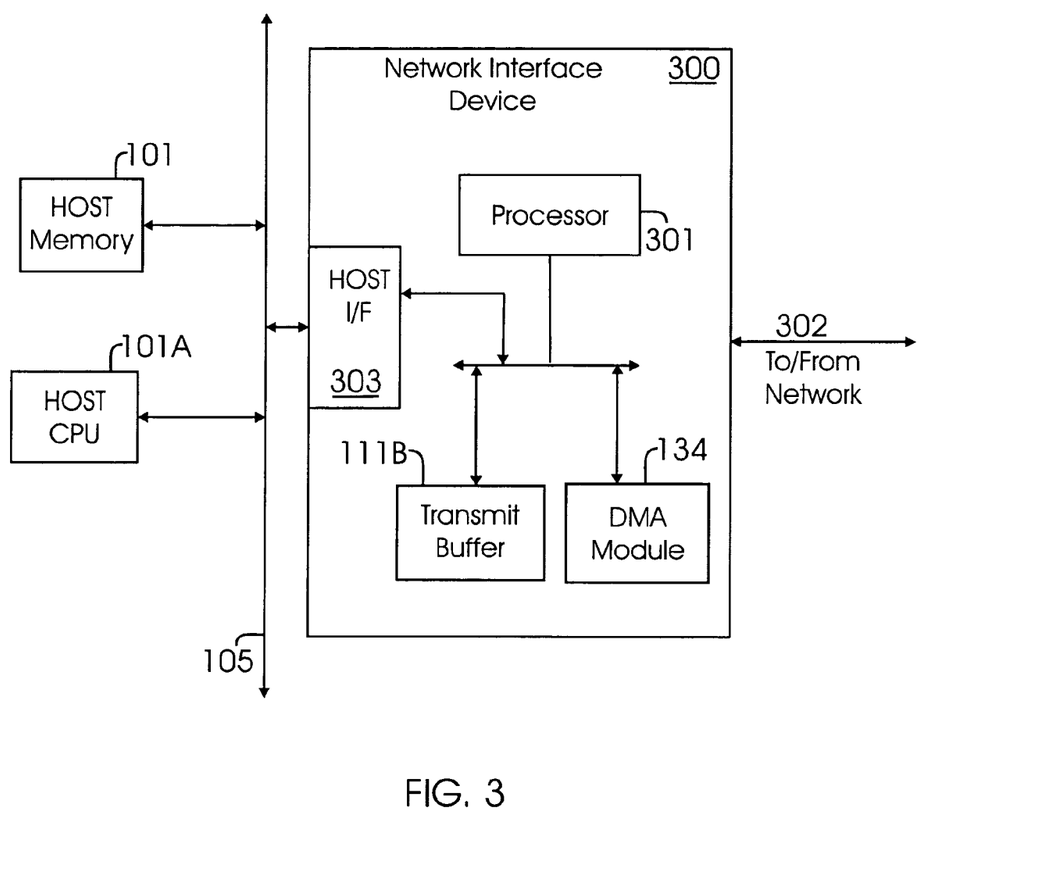
FIG. 3 shows a block diagram of a generic network interface device, used according to one aspect of the present invention.

The foregoing examples have been described with respect to a HBA in a SAN. However, the adaptive aspects of the present invention are applicable in a more generic manner to any I/O device coupled to a host computing system. An example of one such architecture is shown in FIG. 3 where an interface device 300 is coupled to a host CPU 101A and a host memory 101 via a bus 105. Device 300 interfaces with host CPU 101A via a host interface 303.

Device 300 includes transmit buffer 111B, DMA module 134 and a processor 301 (similar to processor 106A). Traffic 302 is sent/received from a network. Transmit buffer 111B and DMA module 134 (that also includes a scheduler 135 (not shown) performs similar function that has been described above. The DMA request processing, according to one aspect of the present invention is now described below with respect to FIG. 4.

Figure 4:
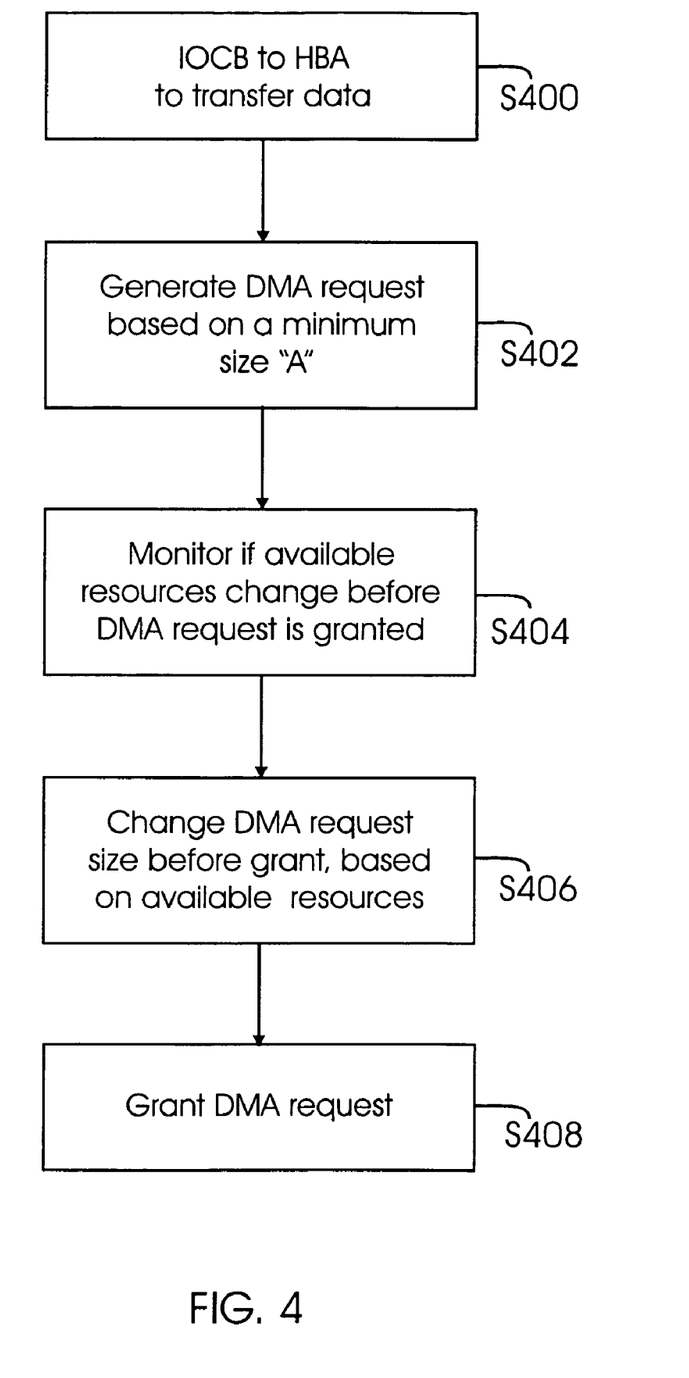
FIG. 4 shows a process flow diagram of combining DMA requests, according to one aspect of the present invention.

Turning in detail to FIG. 4, the host system generates an IOCB that commands HBA 106 to transfer data S400. The IOCB provides the total size of the transfer and the address from where the information is to be transferred. A request queue 103 and a response queue 104 are used to manage the IOCBs (FIG. 1A).

In step S402, a DMA module (e.g. 202) generates a DMA request to transfer data. It is noteworthy that plural DMA modules can generate requests at any given time. The DMA request specifies a minimum size "A" and the address where the information is transferred (derived from the IOCB).

In step S404, while arbiter 204 arbitrates between plural DMA requests, the DMA module (for example, 202) monitors the status from the slots in buffer 201. If another slot becomes available, then the DMA module changes the data transfer size accordingly.

In step S406, based on the status from the buffer slots, the DMA size is changed before arbiter 204 grants the request. The number of available slots from where data can be transferred keeps changing before the grant. The DMA module optimizes the data transfer size depending on the available buffer slots. Thereafter, in step S408, the arbiter 204 grants the request. The DMA size is fixed when the DMA request is granted.

In one aspect of the present invention, an optimum data transfer size is used for each DMA request, instead of using a fixed frame size for every request. This reduces latency in transferring data and improves overall performance.

Although the present invention has been described with reference to specific embodiments, these embodiments are illustrative only and not limiting. Many other applications and embodiments of the present invention will be apparent in light of this disclosure and the following claims.

What is claimed is:

1. A method for processing direct memory access (DMA) requests in a peripheral device, comprising:
   generating a DMA request to transfer information to or from a host system via a buffer having a plurality of buffer slots, wherein a DMA module of the peripheral device generates the DMA request specifying a size of data transfer that is based on a minimum data transfer size;
   submitting the DMA request to an arbitration module to gain access to a bus for transferring the information;
   monitoring a status of the plurality of buffer slots; wherein while the arbitration module arbitrates between pending DMA requests the DMA module monitors the status of the buffer slots and receives an indicator from one or more of the buffer slots as each buffer slot becomes available for receiving information; and
   aggregating the status information regarding the buffer slots;
   wherein the DMA module aggregates status information from the buffer slots, and before the DMA request is granted by the arbitration module the DMA module increases the size of data transfer for the pending DMA request beyond the minimum data transfer size based on the indicators received by the DMA module; and
   wherein, because the DMA module aggregates status information from a plurality of buffer slots, multiple data frames may be transferred under the DMA request.

2. The method of claim 1, wherein the peripheral device is a host bus adapter.

3. The method of claim 2, wherein the host system is coupled to a network via the host bus adapter.

4. The method of claim 2, wherein the host bus adapter uses a receive buffer for storing data before it is transferred to the host system.

5. The method of claim 3, wherein the host bus adapter uses a transmit buffer to send data to the network.

6. The method of claim 1, wherein the bus is a PCI-X, PCI-Express or a PCI bus.

7. A system for processing direct memory access (DMA) requests, comprising:
- a host system; and
- a peripheral device operationally interfacing with the host system, the peripheral device including a DMA module for generating a DMA request to transfer information to or from the host system via a buffer having a plurality of slots, and the DMA module specifies a size of data transfer in the DMA request based on a minimum data transfer size;
- wherein an arbitration module receives the DMA request from the DMA module to gain access to a bus for transferring the information, and while the arbitration module arbitrates between pending DMA requests, the DMA module monitors status of the buffer slots, the DMA module receives an indicator from one or more of the buffer slots as each buffer slot becomes available, the DMA module aggregates status information from the buffer slots, and before the DMA request is granted by the arbitration module the DMA module increases the size of data transfer for the pending DMA request beyond the minimum data transfer size based on the indicators received by the DMA module; and
- wherein because the DMA module aggregates status information from a plurality of buffer slots, multiple data frames may be transferred under the DMA request.

8. The system of claim 7, wherein the peripheral device is a host bus adapter.

9. The system of claim 8, wherein the host system is coupled to a network via the host bus adapter.

10. The system of claim 8, wherein the host bus adapter uses a receive buffer for storing data before it is transferred to the host system.

11. The system of claim 9, wherein the host bus adapter uses a transmit buffer to send data to the network.

12. The system of claim 7, wherein the bus is a PCI-X, PCI-Express or a PCI bus.

13. An input/output peripheral device, comprising:
- a DMA module for generating a direct memory access ("DMA") request to transfer information to or from a host system via a buffer having a plurality of slots, the DMA module specifying a size of data transfer in the DMA request based on a minimum data transfer size; and
- an arbitration module configured to receive the DMA request from the DMA module to gain access to a bus for transferring the information, and while the arbitration module arbitrates between pending DMA requests the DMA module monitors status of the buffer slots, the DMA module receives an indicator from one or more of the buffer slots as each buffer slot becomes available, the DMA module aggregates status information from the buffer slots, and before the DMA request is granted by the arbitration module the DMA module increases the size of data transfer for the pending DMA request beyond the minimum data transfer size based on the indicators received by the DMA module;
- wherein because the DMA module aggregates status information from a plurality of buffer slots, multiple data frames may be transferred under the DMA request.

14. The device of claim 13, wherein the peripheral device is a host bus adapter.

15. The device of claim 14, wherein the host system is coupled to a network via the host bus adapter.

16. The device of claim 14, wherein the host bus adapter uses a receive buffer for storing data before it is transferred to the host system.

17. The device of claim 15, the host bus adapter uses a transmit buffer to send data to the network.

18. The device of claim 13, wherein the bus is a PCI-X, PCI-Express or a PCI bus.

* * * * *

UNITED STATES PATENT AND TRADEMARK OFFICE
CERTIFICATE OF CORRECTION

| | |
|---|---|
| PATENT NO. | : 7,594,057 B1 |
| APPLICATION NO. | : 11/328358 |
| DATED | : September 22, 2009 |
| INVENTOR(S) | : Rajendra R. Gandhi et al. |

It is certified that error appears in the above-identified patent and that said Letters Patent is hereby corrected as shown below:

In column 1, line 52, delete "10 G" and insert -- 10G --, therefor.

In column 4, line 35, delete "de-serializer" and insert -- deserializer --, therefor.

Signed and Sealed this

Fifth Day of October, 2010

David J. Kappos
*Director of the United States Patent and Trademark Office*